UNITED STATES PATENT OFFICE.

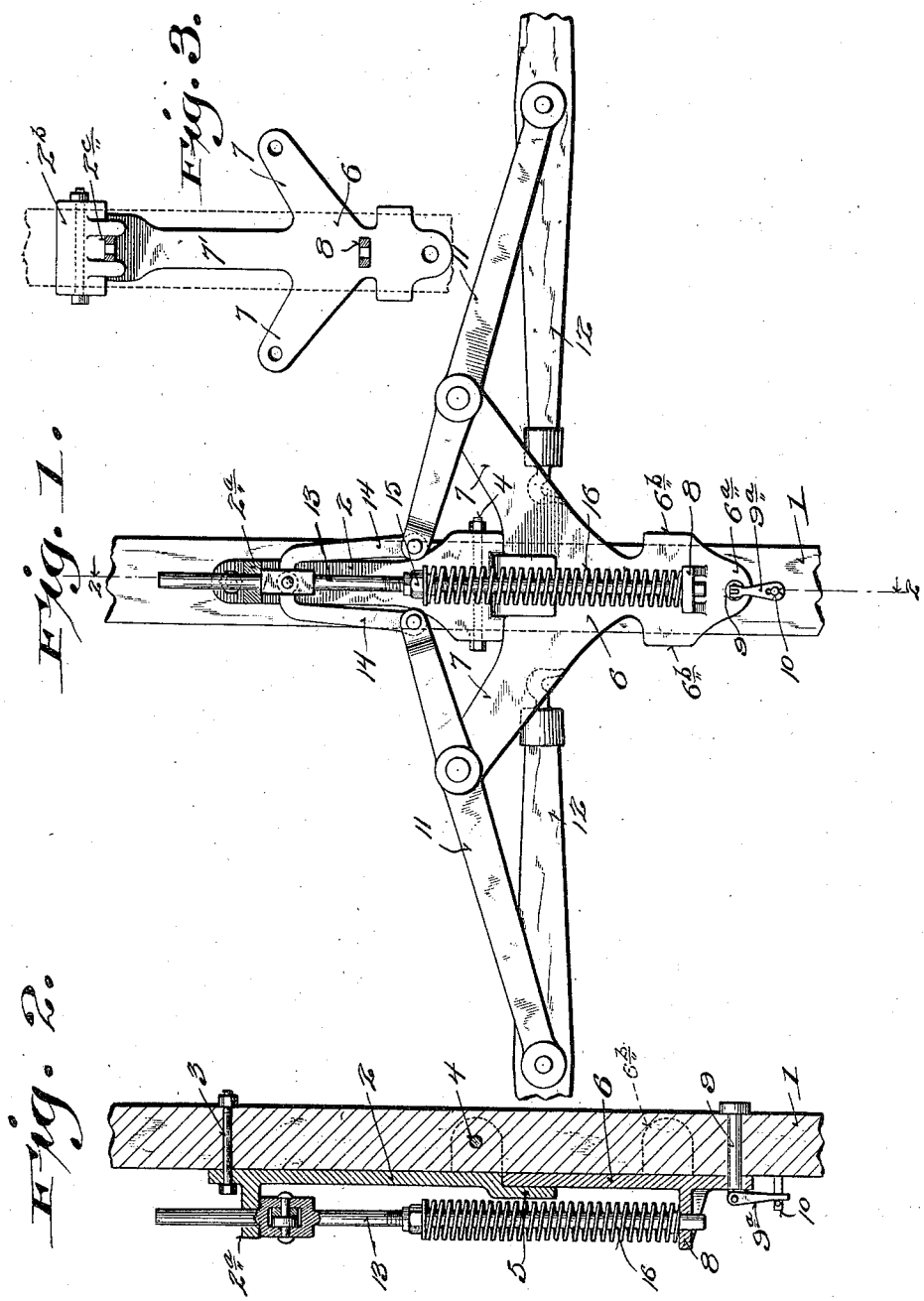

PAUL E. WALDVOGEL, OF MILWAUKEE, WISCONSIN.

DRAFT APPLIANCE.

1,011,288. Specification of Letters Patent. Patented Dec. 12, 1911.

Application filed May 9, 1911. Serial No. 626,017.

*To all whom it may concern:*

Be it known that I, PAUL E. WALDVOGEL, a citizen of the United States, and resident of Milwaukee, in the county of Milwaukee and State of Wisconsin, have invented certain new and useful Improvements in Draft Appliances; and I do hereby declare that the following is a full, clear, and exact description thereof.

My invention has reference to draft appliances for teams, its object being to provide a simple, economical and effective yieldable connection between the load and draft animals whereby dead strain upon said animals is relieved due to the cushion effect.

Particular stress is placed upon the fact that the construction and arrangement of my invention is such that the swingle-trees are connected to separate levers, which levers, in turn, are each fulcrumed to a draft member with their whiffle-tree connections arranged to oppose a yielding member or spring whereby each animal is rendered capable of sustaining the load to a greater or less degree independent of the other. Thus where a pair of animals of an unequal weight or strength are harnessed to a load the weaker animal (or colt) is not called upon to sustain a greater burden than is consistent with its draft power, each animal being in effect independently hitched to said load. Heretofore, so far as I am aware, springs have been utilized in various forms in connection with pivoted double-trees or levers, but with this arrangement the stronger or more energetic animal will exert a back draft upon the weaker due to the swivel connection between the double-tree and draft member. By employing my essential feature hence is the arrangement whereby a pair of levers which may be considered the double-tree are each connected to a yoke that is rigidly secured to the draft member and thus if one of the animals tends to draw the major part of the load the traces of the animal connected to the opposite swingle-tree will be slackened.

Another object of my invention is to provide a draft rigging that can be quickly and readily interchanged from one draft appliance to another whereby the same may be utilized for plowing or applied to vehicles.

With the above objects in view my invention consists in what is herein described, illustrated and claimed.

In the drawings Figure 1 represents an inverted plan view of a draft rigging embodying the features of my invention with parts broken away and parts in section for clearness in the illustration, Fig. 2, a detailed longitudinal sectional view, the section being indicated by line 2—2 of Fig. 1, and Fig. 3, a detail plan view of another form of draft rigging embodying the features of my invention.

Referring by characters to the drawings, 1 represents a pole which constitutes the draft member and 2 a bracket that is permanently secured to the underside of said tongue by a vertically disposed bolt 3 and a horizontally disposed bolt 4, which latter bolt passes through the tongue and depending ears of the bracket which overlap said tongue. The bracket is also provided with an overhanging lip 5 for engagement with the body portion of a yoke 6, which yoke is provided with laterally extending arms 7 and a projecting apertured ear 8, there being a similar apertured ear $2^a$ that projects from the bracket 2 and is in axial alinement with the first named ear. The yoke 7 is detachably connected to the tongue by a locking bolt 9 which is carried by said tongue and arranged to pass through an apertured head $6^a$ of the yoke, the locking bolt being provided with a pivoted latch $9^a$ that is provided with an aperture for engagement with a pin 10 carried by the aforesaid latch. By this arrangement the yoke can be readily attached to the tongue by first inserting its body portion under the lip 5 of bracket 2 and thereafter the bolt 9 is passed through the apertured head $6^a$ and locked, its pivoted latch being turned down for engagement with the pin 10 in which position it is secured by a split key that passes through said pin, the yoke being held against lateral play by its abutting engagement with the bracket 2 and also by a pair of feet $6^b$ that overlap the sides of the tongue 1.

Fulcrumed to each arm 7 is a lever 11, and to the outer ends of each are connected the usual whiffletrees 12 whereby the draft animals are connected to the rigging. These levers 11 in effect constitute a double-tree and their inner ends are connected to the plunger-rod 13 by links 14, the plunger-rod being reciprocatively mounted in the ears 8 and $2^a$ of the yoke and bracket respectively. The plunger-rod 13 is provided with a screwthreaded section for the reception of an adjusting nut 15, between which nut and the ear 8 is interposed a compression spring 16, the latter being coiled about said plunger-rod and is adjusted as to its resistance by means of the nut 15.

From the foregoing description it will be readily seen that the levers which constitute a two-part double-tree are each fulcrumed rigidly to the draft member through the yoke 6 and being connected to the spring-controlled plunger-bar when draft power is applied to one of said yokes the application of this power will not cause a backward draft upon the opposite lever and hence each draft animal that is connected to the whiffletrees, while having a yielding pull relative to the load, is independent of the pull or draft imparted by the opposite animal. It will also be readily seen that the draft member or tongue 1 of any number of draft appliances may each be provided with a bracket 2 and when it is desired to detach the draft rigging from one of such draft members this can readily be effected by removing the yoke 6 and fitting it to the draft member of another vehicle or appliance. It will also be understood that, in some instances, I may use a plurality of springs in place of a single spring and while I have shown the yoke and bracket separable, it is apparent that these parts may constitute a single member which can be removed or adjusted to the draft tongue of a vehicle or to a plow beam.

As shown in Fig. 3, the yoke 6 is designed to be detached from the tongue for the purpose of convenient connection to plows or other tongueless implements and in this form of device the yoke is provided with a central stem 7' the end of which stem is arranged to engage tongues of a bracket 2$^b$, the central stem in this instance being provided with an ear 2$^c$, which, in conjunction with ear 8 serves as a guide for the plunger-rod 13. The bracket 2$^b$ is permanently secured to the tongue and thus the entire draft rigging mechanism can be quickly detached from said tongue for the purpose specified.

I claim:

1. A draft rigging comprising a draft member, an armed yoke rigidly secured to the draft member, a lever fulcrumed to each arm, a spring-controlled plunger mounted in the yoke, links connecting the plunger and inner ends of each lever, and swingletrees carried by the opposite ends of the levers.

2. A draft rigging comprising a draft member, a bracket permanently secured to the draft member provided with an apertured ear, an armed yoke fitted to the bracket, means for detachably securing the armed yoke to the draft member, an apertured ear extending from the yoke, a spring-controlled plunger-rod mounted in the yoke and bracket ears, a lever fulcrumed to each arm, links connecting the inner ends of the levers and plunger-rod, and swingle-trees mounted upon the outer ends of the levers.

In testimony that I claim the foregoing I have hereunto set my hand at Park Falls in the county of Price and State of Wisconsin in the presence of two witnesses.

PAUL E. WALDVOGEL.

Witnesses:
JOHN STOLTZ,
WALTER BLUME.

---

Copies of this patent may be obtained for five cents each, by addressing the "Commissioner of Patents, Washington, D. C."